(No Model.)
W. L. STICKLES.
ATTACHMENT FOR PLANTERS.
No. 532,295. Patented Jan. 8, 1895.
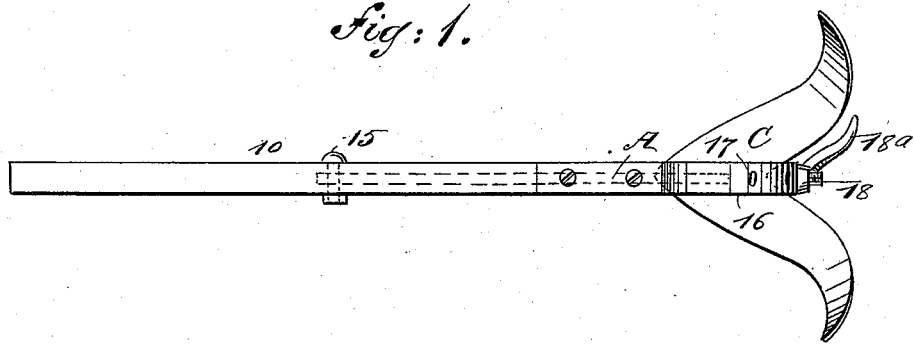
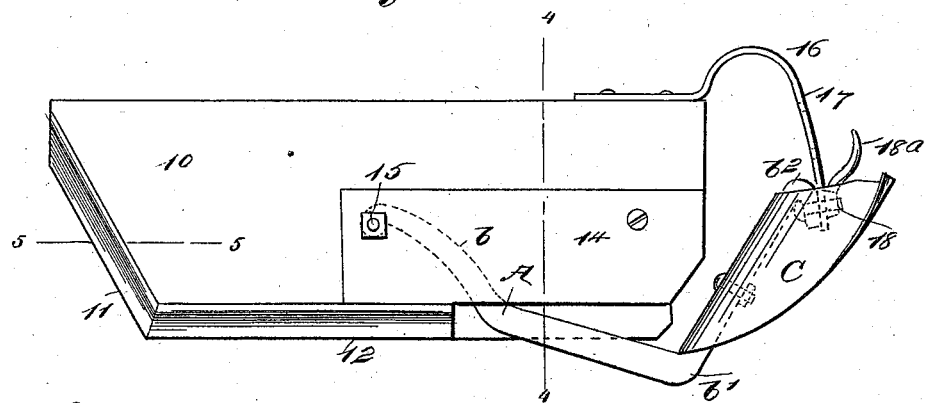
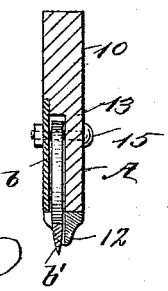
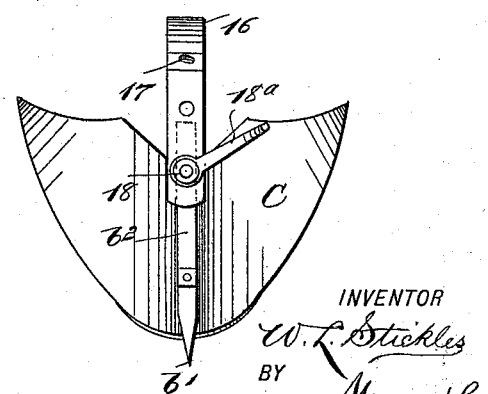
WITNESSES:
INVENTOR
W. L. Stickles
BY
Munn & Co
ATTORNEYS.

UNITED STATES PATENT OFFICE.

WILLIAM L. STICKLES, OF CHURCHTOWN, NEW YORK.

ATTACHMENT FOR PLANTERS.

SPECIFICATION forming part of Letters Patent No. 532,295, dated January 8, 1895.

Application filed May 11, 1894. Serial No. 510,892. (No model.)

*To all whom it may concern:*

Be it known that I, WILLIAM L. STICKLES, of Churchtown, in the county of Columbia and State of New York, have invented a new and useful Improvement in Attachments for Planters, of which the following is a full, clear, and exact description.

My invention relates to an attachment for planters, and it has for its object especially to provide an attachment for the marker runner or shoe of a planter, which will form a furrow having a clean cut bed and without clods to interfere with the growing plants, the ground at each side of the furrow being left exceedingly light.

A further object of the invention is to provide a furrow attachment for the runners of planters, especially those adapted for marking a field to be planted by hand, which attachment may be expeditiously and conveniently adjusted to run as deeply in the ground as may be desired.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the runner having the improvement applied thereto. Fig. 2 is a side elevation of the runner and the attachment. Fig. 3 is an end view of the attachment. Fig. 4 is a transverse section through the runner, taken essentially on the line 4—4 of Fig. 2; and Fig. 5 is a partial longitudinal section through the runner, taken essentially on the line 5—5 of Fig. 2.

The runner 10 is preferably provided with a beveled front and bottom edge 11 and 12, and usually the said edge in cross section comprises a substantially half-round body $a$, and a wedge-shaped tongue or cutting section $a'$, as shown in Fig. 5. Such a cutting surface may be applied to any form of runner, and need not necessarily constitute an integral portion of the runner. At the heel of the runner in one side face a recess 13, is produced longitudinally therein, which recess may be carried forward as far as in practice may be found desirable; and the said recess is made to extend downward centrally through the bottom edge 12 of the runner, as shown in Fig. 2. The recess is converted into a pocket usually by closing that portion contained in the body of the runner by a plate 14, or the equivalent thereof.

The attachment consists of a marking arm A and a share C, and means for adjusting the share and marking arm. The marker or marking arm A comprises a bar of metal, the forward end of which is curved and extends within the recess 13 to a point near the forward end of said recess, where the said forward end of the marker is pivoted through the medium of a bolt 15, or like device. The marker extends downward and rearward from its pivot, and its inner curved surface $b$ is made to meet a substantially straight marking section $b'$, the said marking section being made tapering upon both sides, whereby it is substantially wedge-shaped in cross section as illustrated in Fig. 4. The formation of the marker or marking arm is completed by projecting upwardly and rearwardly from the rear end of the marking section $b'$ a shank $b^2$, the upper end of which is usually downwardly curved.

The share C is attached to the shank $b^2$ of the marker, and this share comprises two wings preferably integral and extending from opposite sides of the front portion of the shank in an outwardly and rearwardly direction, one wing extending to the right and the other to the left, and the upper edges of both wings are decidedly forwardly and outwardly curved. Thus the share presents a decided sweep at each side of the shank $b^2$ of the marker, and will consequently throw the dirt loosely well to each side of the furrow made by the marker. The marker is made to run more or less deeply in the ground by adjusting it vertically, and this is usually accomplished by attaching to the upper rear portion of the runner a bracket 16, which is curved in a downwardly direction and is provided with a series of apertures 17. A bolt 18 is passed through an opening made in the upper curved portion of the shank $b^2$, and is passed through an upper, lower or intermediate aperture 17, according to the adjustment required, and the shank and bracket are secured together through the medium of a nut 18ª, preferably of the wing pattern. Thus it will be observed that by raising and lowering the cutter the cutting section will enter the ground more or less deeply, making a more or less decided furrow; and the furrow will be widened to a predetermined extent by the share C following the marking section of the marker; and when the marker is not required at all it may be adjusted upward until it is contained sufficiently within the recess 13.

Having thus described my invention, I claim as new and desire to secure by Letters Patent—

1. A runner marker or shoe for planters, having a marker pivotally attached thereto, means for adjusting the said marker below the lower edge of the runner, and a share carried by a rearward extension of the marker, as and for the purpose set forth.

2. A planter shoe marker or runner, the same being provided with a recess at its heel, an angular marking arm having one end pivoted in the said recess and provided with a marking section capable of being carried within the recess, or downward below the lower edge of the runner, and an adjustable connection between the rear end of the marking arm and the runner, as and for the purpose set forth.

3. The combination, with a runner marker or shoe provided with a recess at its heel, of a marking arm having one end pivoted in the said recess and provided with a marking section capable of being carried within the recess or below the lower edge of the runner, the said marking arm being further provided with an upwardly-extending rear section, a bracket projected from the runner, and means, substantially as described, for adjustably connecting the rear section of the marking arm with the said bracket, as and for the purpose set forth.

4. The combination, with a runner marker or shoe, having a recess at its heel, of a marking arm, one end of which is pivoted in the said recess, the said arm being provided with a marking section capable of extending below the lower edge of the runner, or of being carried upward within the recess, and an upwardly and rearwardly extending shank section, a share secured to the shank section of the marking arm, the said share comprising two sweeps extending outwardly in opposite directions and rearwardly from the said shank, and an adjustable connection between the shank and the runner, substantially as and for the purpose specified.

5. The combination with the runner or marker having a forward and bottom marking surface, the said surface consisting of a substantially half-round body, and a substantially wedge-shaped marking tongue or section projected from the body, of a marking arm extending below the rear portion of the shoe and provided with a share substantially as shown and described.

WILLIAM L. STICKLES.

Witnesses:
EUGENE C. SHULTZ,
WILLIAM H. ROCKEFELLER.